(12) United States Patent
Baek et al.

(10) Patent No.: US 9,146,415 B2
(45) Date of Patent: Sep. 29, 2015

(54) APPARATUS AND METHOD FOR MANUFACTURING ENCAPSULATED LIQUID CRYSTALS AND LIQUID CRYSTAL DISPLAY INCLUDING THE ENCAPSULATED LIQUID CRYSTALS

(75) Inventors: Jong-In Baek, Yongin (KR); Kee-Han Uh, Yongin (KR); Jae-Hyun Kim, Yongin (KR); Chul Gyu Jhun, Asan-Si (KR); Won-Sang Park, Yongin (KR); Jae-Ik Lim, Yongin (KR)

(73) Assignees: Samsung Display Co., Ltd., Samsung-ro, Giheung-Gu, Yongin-si, Gyeonggi-Do (KR); HOSEO UNIVERSITY ACADEMIC COOPERATION FOUNDATION, Baebang-Eup, Asan-Si, Chungcheongnam-Do (KR)

( * ) Notice: Subject to any disclaimer, the term of this patent is extended or adjusted under 35 U.S.C. 154(b) by 691 days.

(21) Appl. No.: 13/211,513

(22) Filed: Aug. 17, 2011

(65) Prior Publication Data

US 2012/0162586 A1    Jun. 28, 2012

(30) Foreign Application Priority Data

Dec. 22, 2010  (KR) ................. 10-2010-0132661

(51) Int. Cl.
*G02F 1/1333*    (2006.01)
*C09K 19/02*     (2006.01)
(Continued)

(52) U.S. Cl.
CPC ............... *G02F 1/1334* (2013.01); *B01J 13/14* (2013.01); *C09K 19/544* (2013.01)

(58) Field of Classification Search
USPC .............................................. 349/86–91, 183
See application file for complete search history.

(56) References Cited

U.S. PATENT DOCUMENTS

| 4,435,047 A |   | 3/1984 | Fergason |       |
|-------------|---|--------|----------|-------|
| 4,596,445 A | * | 6/1986 | Fergason | 349/89 |

(Continued)

FOREIGN PATENT DOCUMENTS

| CN | 1179552 A | 4/1998 |
| CN | 1641425 A | 7/2005 |

(Continued)

OTHER PUBLICATIONS

Craig Priest et al., Microfluidic polymer multilayer adsorption on liquid crystal droplets for microcapsule synthesis. Lab on a chip, vol. 8, No. 12, Jan. 1, 2008, pp. 2182. Cited in European Search Report issued by European Patent Office on Mar. 21, 2012 in connection with European Patent Application No. 11193757.9, which also claims Korean Patent Application Serial No. 10-2010-0132661 as its priority document.

(Continued)

*Primary Examiner* — Hoan C Nguyen
(74) *Attorney, Agent, or Firm* — Robert E. Bushnell, Esq.

(57) ABSTRACT

An apparatus for manufacturing encapsulated liquid crystals including at least one first flow duct configured to have liquid crystals flow therethrough, at least one second flow duct configured to have encapsulation film materials flow therethrough, a third flow duct configured to have an inflow portion connected to an outflow portion of the first flow duct and an outflow portion of the second flow duct and to have liquid crystal droplets in which the liquid crystals and the encapsulation film materials are mixed flow therethrough, and a curing machine configured to manufacture the encapsulated liquid crystals by curing the liquid crystal droplets.

17 Claims, 10 Drawing Sheets

(51) Int. Cl.
*G02F 1/1334* (2006.01)
*B01J 13/14* (2006.01)
*C09K 19/54* (2006.01)

(56) References Cited

U.S. PATENT DOCUMENTS

| | | | |
|---|---|---|---|
| 4,662,720 A * | 5/1987 | Fergason | 349/105 |
| 5,156,452 A * | 10/1992 | Drzaic et al. | 349/86 |
| 5,202,063 A | 4/1993 | Andrews et al. | |
| 5,784,136 A * | 7/1998 | Ando et al. | 349/86 |
| 5,835,174 A * | 11/1998 | Clikeman et al. | 349/86 |
| 5,847,787 A * | 12/1998 | Fredley et al. | 349/89 |
| 7,351,506 B2 | 4/2008 | Schneider et al. | |
| 8,269,924 B2 * | 9/2012 | Takahashi et al. | 349/106 |
| 2002/0090470 A1* | 7/2002 | Kubota et al. | 428/1.1 |
| 2002/0130989 A1 | 9/2002 | Nakao et al. | |
| 2002/0197469 A1 | 12/2002 | Clikeman et al. | |
| 2003/0031864 A1 | 2/2003 | Clikeman et al. | |
| 2005/0134791 A1 | 6/2005 | Iwata et al. | |
| 2005/0200775 A1* | 9/2005 | Harada et al. | 349/86 |
| 2006/0134349 A1* | 6/2006 | Chari et al. | 428/1.1 |
| 2007/0109236 A1* | 5/2007 | Yamada et al. | 345/87 |
| 2007/0126951 A1* | 6/2007 | Vogels et al. | 349/86 |
| 2007/0200093 A1 | 8/2007 | West et al. | |
| 2010/0034963 A1 | 2/2010 | Yamazaki et al. | |
| 2010/0159786 A1 | 6/2010 | Bok | |
| 2010/0165260 A1* | 7/2010 | Hiji et al. | 349/89 |
| 2010/0315568 A1* | 12/2010 | Chien et al. | 349/33 |

FOREIGN PATENT DOCUMENTS

| | | | | |
|---|---|---|---|---|
| CN | 101794043 A | 8/2010 | | |
| JP | 06-095082 A | 4/1994 | | |
| JP | 2001-356331 A | 12/2001 | | |
| JP | 2004-059802 A | 2/2004 | | |
| JP | 2005099180 A * | 4/2005 | | G02F 1/1333 |
| JP | 2006058614 | 3/2006 | | |
| KR | 10-0339471 B1 | 12/2002 | | |
| KR | 10-0663716 B1 | 12/2006 | | |
| KR | 10-2009-0068976 A | 6/2009 | | |
| KR | 10-0904269 B1 | 6/2009 | | |
| WO | 96/10774 A1 | 4/1996 | | |

OTHER PUBLICATIONS

Christian Ohm et al., Micro-Actuators Prepared from Liquid Crystalline Elastomers in a Microfluidic Setup. Proceeding of SPIE, Jan. 1, 2010, pp. 76180S-76180S-9. Cited in European Search Report issued by European Patent Office on Mar. 21, 2012 in connection with European Patent Application No. 11193757.9, which also claims Korean Patent Application Serial No. 10-2010-0132661 as its priority document.

Link D R et al., Geometrically Mediated Breakup of Drops in Microfluidic Devices. Physical Review Letters, American Physical Society, New York, US, vol. 92, No. 5, Feb. 6, 2004, pp. 54503-1. Cited in European Search Report issued by European Patent Office on Mar. 21, 2012 in connection with European Patent Application No. 11193757.9, which also claims Korean Patent Application Serial No. 10-2010-0132661 as its priority document.

Hamlington B D et al., Liquid crystal droplet production in a microfluidic device, Liquid Crystals: An International Journal of Science and Technology, Taylor & Francis, GB, vol. 34, No. 7, Jul. 1, 2007, pp. 861-870. Cited in European Search Report issued by European Patent Office on Mar. 21, 2012 in connection with European Patent Application No. 11193757.9, which also claims Korean Patent Application Serial No. 10-2010-0132661 as its priority document.

* cited by examiner

APPARATUS AND METHOD FOR MANUFACTURING ENCAPSULATED LIQUID CRYSTALS AND LIQUID CRYSTAL DISPLAY INCLUDING THE ENCAPSULATED LIQUID CRYSTALS

CLAIM OF PRIORITY

This application claims the benefit of Korean Patent Application No. 10-2010-0132661, filed on Dec. 22, 2010, in the Korean Intellectual Property Office, the disclosure of which is incorporated herein in its entirety by reference.

BACKGROUND OF THE INVENTION

1. Field of the Invention

The general inventive concept relates to an apparatus and method for manufacturing encapsulated liquid crystals and a liquid crystal display (LCD) including the encapsulated liquid crystals.

2. Description of the Related Art

Liquid crystal display (LCD) devices are being focused on as flat panel display devices that may resolve problems seen in cathode ray tube (CRT) display apparatuses due to having smaller sizes, lighter weights, smaller thicknesses, and lower power consumption. Generally, an LCD device is a display device that can change arrangements of liquid crystal molecules, which have material properties between those of liquids and those of solids, in liquid crystal cells by applying an external electric field to change optical properties including double refraction, circumpolarization, and light diffusion properties of the liquid crystal cells. Recently, for miniaturization of an LCD device, continuous research is being performed on components constituting an LCD device, e.g., a backlight, a connector, a printed circuit board (PCB), and a combination structure.

A liquid crystal display (LCD) includes two sheets of substrates having electrodes formed therein and a liquid crystal layer inserted between the substrates and controls the amount of light passing therethrough by rearranging the liquid crystal molecules of the liquid crystal layer by supplying voltage to the electrodes.

In the case where the liquid crystal layer of the liquid crystal display (LCD) is formed of a plurality of encapsulated liquid crystals, a screen distortion phenomenon, occurring when the liquid crystal display (LCD) is bent or when pressure is applied to a surface of the liquid crystal display (LCD), can be minimized.

The encapsulated liquid crystals are chiefly manufactured by stirring liquid crystals and an encapsulation film material using a stirrer. In this case, it is difficult to uniformly implement the size of the encapsulated liquid crystals. A liquid crystal display (LCD) using encapsulated liquid crystals of a non-uniform size has a different electro-optical characteristic according to the size of the encapsulated liquid crystals. Since the size of the encapsulated liquid crystals is non-uniform, scattering is generated because of a difference in the refractive index between the liquid crystals and the encapsulation film forming the encapsulated liquid crystals, thereby deteriorating an optical characteristic.

The above information disclosed in this Related Art section is only for enhancement of understanding of the background of the described technology and therefore it may contain information that does not form the prior art that is already known in this country to a person of ordinary skill in the art.

SUMMARY OF THE INVENTION

The described technology has been made in an effort to provide an apparatus and method for manufacturing encapsulated liquid crystals and a liquid crystal display (LCD) including the encapsulated liquid crystals, having an advantage in that the encapsulated liquid crystals of a uniform size can be manufactured.

An apparatus for manufacturing encapsulated liquid crystals according to an exemplary embodiment may include at least one first flow duct configured to have liquid crystals flow therethrough, at least one second flow duct configured to have encapsulation film materials flow therethrough, a third flow duct configured to have an inflow portion connected to an outflow portion of the first flow duct and an outflow portion of the second flow duct and to have liquid crystal droplets in which the liquid crystals and the encapsulation film materials are mixed flow therethrough, and a curing machine configured to manufacture the encapsulated liquid crystals by curing the liquid crystal droplets.

A liquid crystal droplet generator where the outflow portion of the first flow duct, the outflow portion of the second flow duct, and the inflow portion of the third flow duct are met may manufactures the liquid crystal droplets by mixing the liquid crystals and the encapsulation film materials.

The apparatus may further include a first injector for injecting the liquid crystals into the first flow duct and a second injector for injecting the encapsulation film materials into the second flow duct.

The flux and flow rate of the liquid crystals flowing through the first flow duct may be controlled by adjusting the pressure of the first injector, and the flux and flow rate of the encapsulation film materials flowing through the second flow duct may be controlled by adjusting the pressure of the second injector.

The encapsulation film materials may include a silica-based or fluorine-based UV-curable surface active agent or any one selected from among different kinds of curable surface active agents.

The encapsulation film materials may include any one selected from among deionized gelatine, polyvinyl alcohol, and latex.

The diameter of the first flow duct to the third flow duct may be a micrometer unit.

The second flow duct and the third flow duct may be placed on the same straight line, and the first flow duct may be orthogonal to the second flow duct and the third flow duct at the liquid crystal droplet generator.

The first flow duct and the third flow duct may be placed on the same straight line, and the second flow duct may be orthogonal to the first flow duct and the third flow duct at the liquid crystal droplet generator.

The first flow duct and the third flow duct may be placed on the same straight line, the second flow duct may be orthogonal to the first flow duct and the third flow duct at the liquid crystal droplet generator, and the second flow duct may include a second upper flow duct and a second lower flow duct which are met at the liquid crystal droplet generator.

Furthermore, a method of manufacturing encapsulated liquid crystals according to an exemplary embodiment may include injecting liquid crystals into a first flow duct using a first injector, injecting encapsulation film materials into a second flow duct using a second injector, producing liquid crystal droplets in which the liquid crystals and the encapsulation film materials are mixed at a liquid crystal droplet generator where an outflow portion of the first flow duct, an outflow portion of the second flow duct, and an inflow portion of the third flow duct are met, and manufacturing the encapsulated liquid crystals by curing the liquid crystal droplets.

The encapsulated liquid crystals may be manufactured by curing the encapsulation film materials of the liquid crystal droplets flowing through the third flow duct.

The encapsulated liquid crystals may be manufactured by curing the encapsulation film materials of the liquid crystal droplets drained from the third flow duct.

The flux and flow rate of the liquid crystals flowing through the first flow duct may be controlled by adjusting the pressure of the first injector, and the flux and flow rate of the encapsulation film materials flowing through the second flow duct may be controlled by adjusting the pressure of the second injector.

The encapsulation film materials may include any one selected from among a silica-based or fluorine-based UV-curable surface active agent, different kinds of curable surface active agents, deionized gelatine, polyvinyl alcohol, and latex.

Furthermore, a liquid crystal display (LCD) according to an exemplary embodiment may include a first substrate, a first electrode formed on the first substrate, a second substrate configured to face the first substrate, a second electrode formed on the second substrate, and a liquid crystal layer formed between the first electrode and the second electrode and configured to include a plurality of encapsulated liquid crystals, including liquid crystals and encapsulation films each surrounding the liquid crystals. The diameter of the plurality of encapsulated liquid crystals may have a deviation of ±6.5%.

The encapsulated liquid crystals may include cholesteric encapsulation liquid crystals, including cholesteric liquid crystals and cholesteric encapsulation films each surrounding the cholesteric liquid crystals.

The encapsulated liquid crystals may include left-handed cholesteric encapsulation liquid crystals, including left-handed cholesteric liquid crystals and left-handed cholesteric encapsulation films each surrounding the left-handed cholesteric liquid crystals, and right-handed cholesteric encapsulation liquid crystals, including right-handed cholesteric liquid crystals and right-handed cholesteric encapsulation films each surrounding the right-handed cholesteric liquid crystals.

The left-handed cholesteric encapsulation liquid crystals may form a left-handed cholestric liquid crystal encapsulation layer, and the right-handed cholesteric encapsulation liquid crystals may form a right-handed cholestric liquid crystal encapsulation layer.

The encapsulated liquid crystals may include nematic encapsulation liquid crystals, including nematic liquid crystals and nematic encapsulation films each surrounding the nematic liquid crystals.

The encapsulated liquid crystals may be dispersed.

The encapsulated liquid crystals may form at least one layer.

The liquid crystal display may further include nanoparticles dispersed between the encapsulated liquid crystals, and the nanoparticles may have a different dielectric constant from the encapsulation film.

The encapsulated liquid crystals may have a diameter of 10 nm to 100 μm, and the encapsulation film may have a thickness of 1 nm to 10 μm.

According to the present invention, encapsulated liquid crystals of a uniform size can be manufactured by introducing liquid crystals and an encapsulation film material into the first flow duct and the second flow duct, respectively, and controlling the flux, the flow rate, etc. of the liquid crystals and the encapsulation film material.

Furthermore, since a liquid crystal layer including the encapsulated liquid crystals of a uniform size is formed, a liquid crystal display (LCD) having a constant electro-optical characteristic and an excellent optical characteristic can be manufactured.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present invention. The present invention may be implemented in several different forms and is not limited to the exemplary embodiments.

In order to clarify a description of the present invention, parts not related to the description are omitted, and the same reference numbers are used throughout the drawings to refer to the same or like parts.

The size and thickness of each element shown in the drawings is arbitrary, for convenience of description, and the present invention is not limited thereto.

Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

An apparatus for manufacturing encapsulated liquid crystals according to a first exemplary embodiment is described in detail below with reference to FIGS. 1 and 2.

Figure 1:
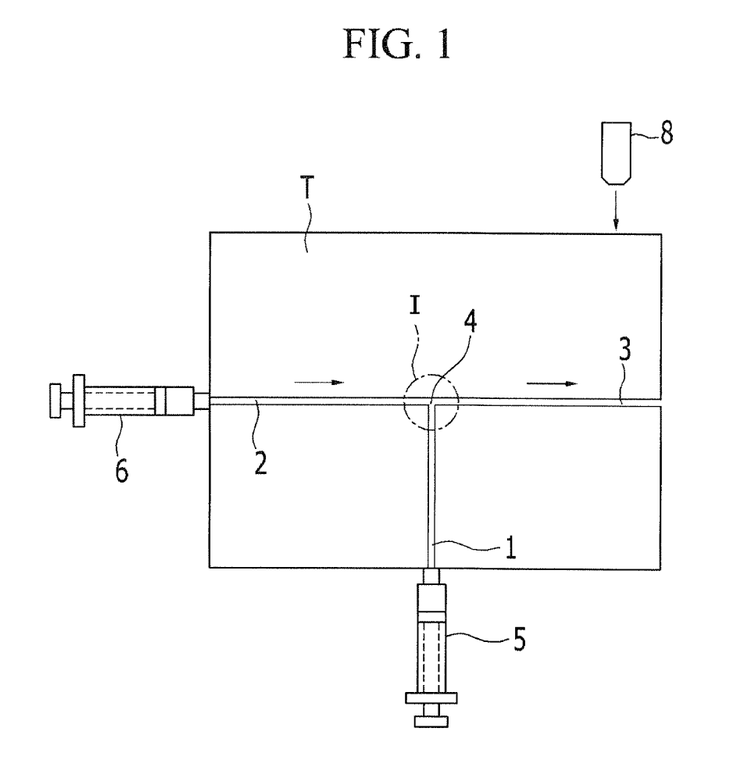
FIG. 1 is a schematic diagram showing an apparatus for manufacturing encapsulated liquid crystals according to a first exemplary embodiment.
Figure 2:
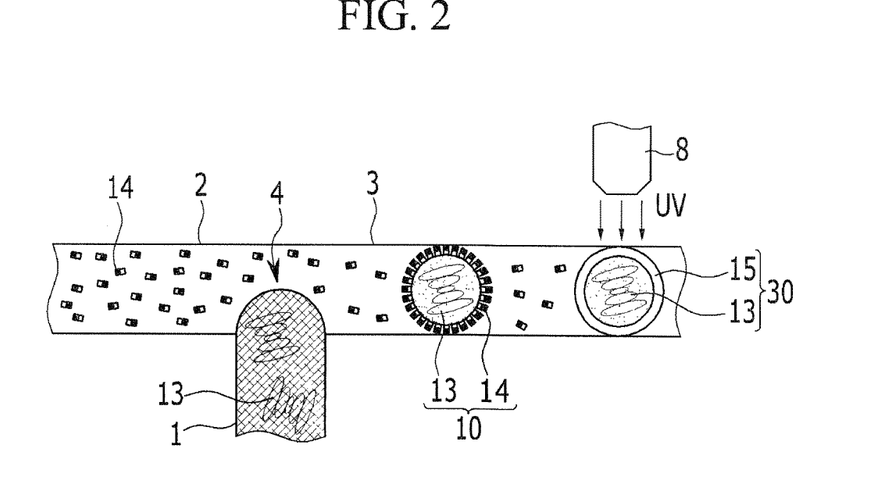
FIG. 2 is an enlarged view of a portion I in FIG. 1.

FIG. 1 is a schematic diagram showing the apparatus for manufacturing encapsulated liquid crystals according to the first exemplary embodiment, and FIG. 2 is an enlarged view of a portion I in FIG. 1.

As shown in FIGS. 1 and 2, the apparatus for manufacturing encapsulated liquid 15, crystals according to the first exemplary embodiment may include a first flow duct 1 configured to have liquid crystals 13 flow therethrough, a second flow duct 2 configured to have encapsulation film materials 14 flow therethrough, and a third flow duct 3 configured to have an inflow portion coupled to the outflow portion of the first flow duct 1 and to the outflow portion of the second flow duct 2.

The liquid crystals 13 may be cholesteric liquid crystals or nematic liquid crystals. The encapsulation film materials 14 may be a silica-based or fluorine-based UV-curable surface active agent or a different kind of a curable surface active agent. Furthermore, the encapsulation film materials 14 may be a water-soluble polymer material, such as deionized gelatine, polyvinyl alcohol, and latex.

The first to third flow ducts 1, 2, and 3 may have a pipe pattern formed in a frame T made of polydimethylsiloxane (PDMS), silicon, or glass. The diameter of each of the first to third flow ducts 1, 2, and 3 may be measured in micrometer(s) (μm).

A first injector 5 for injecting the liquid crystals 13 into the first flow duct 1 may be connected to the inflow portion of the first flow duct 1, and a second injector 6 for injecting the encapsulation film materials 14 into the second flow duct 2 may be connected to the inflow portion of the second flow duct 2. The first injector 5 controls the flux and flow rate of the liquid crystals 13, flowing through the first flow duct 1, by controlling the pressure of the liquid crystals 13. The second injector 6 controls the flux and flow rate of the encapsulation film materials 14, flowing through the second flow duct 2, by controlling the pressure of the encapsulation film materials 14.

A liquid crystal droplet generator 4 may be formed at a portion where the outflow portion of the first flow duct 1, the outflow portion of the second flow duct 2, and the inflow portion of the third flow duct 3 meet. The second flow duct 2 and the third flow duct 3 may be placed on the same straight line. The first flow duct 1 may be orthogonal to the second flow duct 2 and the third flow duct 3 at the liquid crystal droplet generator 4, and the locations of the first flow duct 1 and the second flow duct 2 may be exchanged. The liquid crystal droplet generator 4 produces liquid crystal droplets 10 by mixing the liquid crystals 13 and the encapsulation film materials 14.

When the liquid crystals 13 and the encapsulation film are injected into the first flow duct 1 and the second flow duct 2 of approximately a micrometer in size, the liquid crystals 13 and the encapsulation film materials 14 are mixed in the liquid crystal droplet generator 4 where the first flow duct 1 and the second flow duct 2 are met by means of hydrodynamic instability, thus producing the liquid crystal droplets 10. The encapsulation film materials 14 surround the circumferences of the liquid crystals 13 by means of a self-assembly effect.

Furthermore, a curing machine 8 for curing the liquid crystal droplets 10 is spaced apart from the first to third flow ducts 1, 2, and 3. The curing machine 8 radiates ultraviolet (UV) onto the liquid crystal droplets 10 to cure the encapsulation film materials 14 of the liquid crystal droplets 10 into encapsulation films 15, thereby making the liquid crystal droplets 10 into the encapsulated liquid crystals 30.

In this case, the size of the liquid crystal droplet 10 or the encapsulated liquid crystal 30 may be controlled by adjusting surface tension, viscosity, the flux, and the flow rate (or flow pressure) of the liquid crystals 13 and the encapsulation film materials 14.

Since the diameter of each of the first to third flow ducts 1, 2, and 3 is in micrometer (μm) units, the diameter of the encapsulated liquid crystal 30 flowing through the third flow duct 3 may be in micrometer (μm) units. For example, the diameter of the encapsulated liquid crystal 30 may be 10 nm to 100 μm Furthermore, the plurality of encapsulated liquid crystals 30 manufactured using the apparatus for manufacturing encapsulated liquid crystals has a uniform size, and the encapsulated liquid crystals 30 may have a diameter within a deviation of ±6.5%.

In the case where encapsulated liquid crystals are manufactured using a conventional apparatus for manufacturing encapsulated liquid crystals using a stirrer, when the amount of liquid crystals is 1 ml, the amount of encapsulation film materials is 100 ml, and the stirrer is rotated at the rate of 500 rpm for one hour, an encapsulated liquid crystal having a maximum diameter, from among manufactured encapsulated liquid crystals, is 4.62 μm in diameter, an encapsulated liquid crystal having a minimum diameter, from among the manufactured encapsulated liquid crystals, is 1.68 μm in diameter, and the manufactured encapsulated liquid crystals have an average diameter of 2.67 μm. Accordingly, the encapsulated liquid crystals have a large deviation of ±50% or higher on the basis of the diameter of the encapsulated liquid crystal having the average value. A liquid crystal display (LCD) using the encapsulated liquid crystals of a non-uniform size has a different electro-optical characteristic according to the size of the encapsulated liquid crystals. Furthermore, since the size of the encapsulated liquid crystals is non-uniform, scattering is generated owing to a difference in the refractive index between liquid crystals and an encapsulation film forming the encapsulated liquid crystals, thereby deteriorating an optical characteristic.

However, in the case where the encapsulated liquid crystals 30 were manufactured using the apparatus for manufacturing encapsulated liquid crystals according to the first exemplary embodiment, when the flow rate of the liquid crystals 13 was 37 μl/min and the flow rate of the encapsulation film materials 14 was 5000 μl/min, an encapsulated liquid crystal having a maximum diameter, from among the manufactured encapsulated liquid crystals 30, was 56.1 μm in diameter, an encapsulated liquid crystal having a minimum diameter, from among the manufactured encapsulated liquid crystals 30, was 49.4 μm in diameter, and the manufactured encapsulated liquid crystals 30 had an average diameter of 52.9 μm. It can be seen that the encapsulated liquid crystals 30 have a uniform diameter within a deviation of ±6.5% on the basis of the average diameter of the encapsulated liquid crystals 30.

As described above, when a liquid crystal display (LCD) having a liquid crystal layer including the encapsulated liquid crystals 30 of a uniform size is fabricated, a screen distortion phenomenon resulting from external pressure, such as brushing or pooling, can be prevented.

A method of manufacturing the encapsulated liquid crystals using the apparatus for manufacturing encapsulated liquid crystals according to the first exemplary embodiment, described above with reference to FIGS. 1 and 2, is described in detail below with reference to FIGS. 2 to 4.

Figure 3:
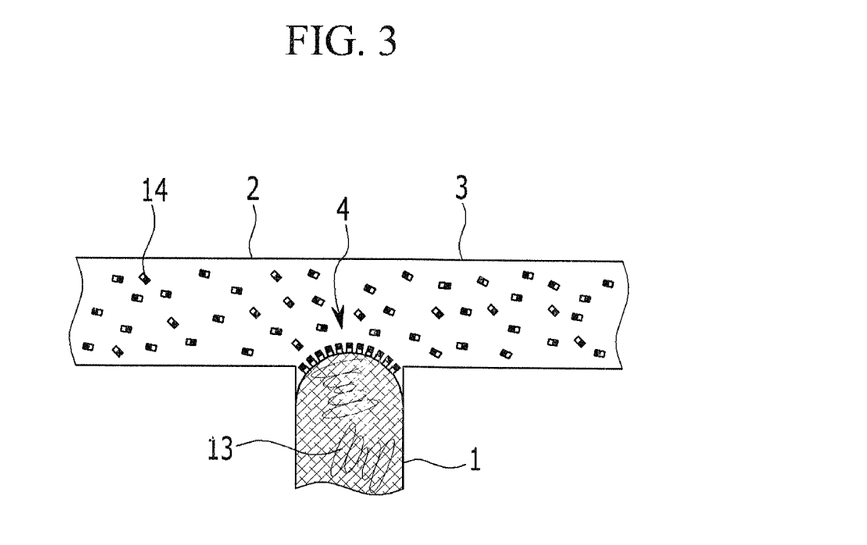
FIGS. 3 and 4 are diagrams sequentially illustrating a method of manufacturing encapsulated liquid crystals using the apparatus for manufacturing encapsulated liquid crystals according to the first exemplary embodiment.
Figure 4:
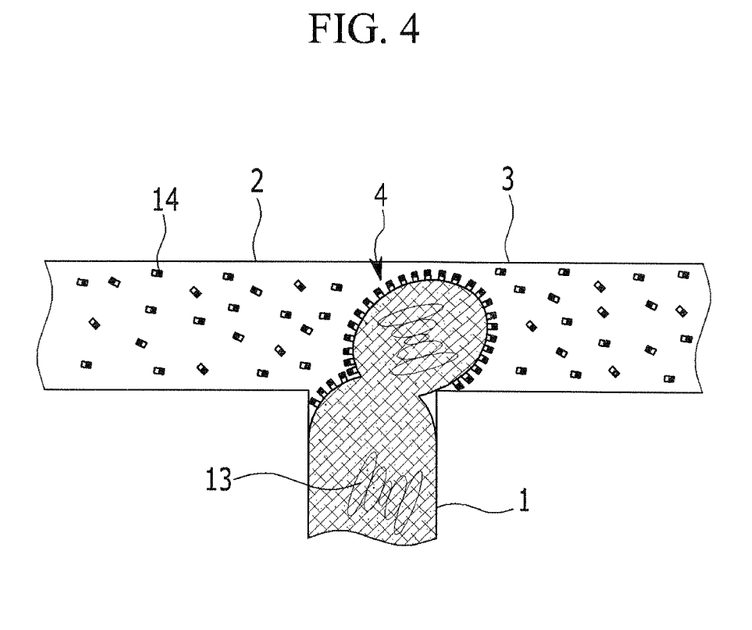

FIGS. 3 and 4 are diagrams sequentially illustrating the method of manufacturing the encapsulated liquid crystals using the apparatus for manufacturing encapsulated liquid crystals according to the first exemplary embodiment.

First, as shown in FIG. 3, the liquid crystals 13 may be injected into the first flow duct 1 using the first injector 5, and the encapsulation film materials 14 may be injected into the second flow duct 2 using the second injector 6. The encapsulation film materials 14 coming in contact with the liquid crystals 13 in the liquid crystal droplet generator 4 are adhered to surfaces of the liquid crystals 13.

Next, as shown in FIG. 4, the liquid crystals 13 and the encapsulation film materials 14 flown into the liquid crystal droplet generator 4 are mixed together. That is, the encapsulation film materials 14 coming into contact with the liquid crystals 13 in the liquid crystal droplet generator 4 are adhered to the surfaces of the liquid crystals 13, thus surrounding the liquid crystals 13. At this time, the liquid crystals 13 are separated from each other in a droplet form by means of the flow pressure of the encapsulation film materials 14.

Next, as shown in FIG. 2, the encapsulation film materials 14 surround the liquid crystals 13 of a droplet form by means of a self-assembly effect, thereby forming the liquid crystal droplets 10.

Next, ultraviolet (UV) is radiated onto the liquid crystal droplets 10, thus curing the encapsulation film materials 14 of the liquid crystal droplets 10 into the encapsulation films 15. Accordingly, the liquid crystal droplets 10 are made into the encapsulated liquid crystals 30. The encapsulated liquid crystals 30 flow along the third flow duct 3.

Alternatively, after the liquid crystal droplets 10 in which the encapsulation film materials 14 surround the liquid crystals 13 of a droplet form are drained from the third flow duct 3, ultraviolet (UV) may be radiated to the liquid crystal droplets 10, thus making the liquid crystal droplets 10 into the encapsulated liquid crystals 30. In this case, the size of the encapsulated liquid crystals 30 may be controlled by adjusting surface tension, viscosity, the flux, and the flow rate (or flow pressure) of the liquid crystals 13 and the encapsulation film materials 14.

A plurality of the encapsulated liquid crystals 30 can be fabricated by repeating the above manufacturing process, and the encapsulated liquid crystals 30 of a uniform size can be fabricated. Each of the encapsulated liquid crystals 30 may have a diameter within a deviation of ±6.5%.

By manufacturing a liquid crystal display (LCD) having a liquid crystal layer including the encapsulated liquid crystals 30 of a uniform size as described above, a screen distortion phenomenon resulting from external pressure can be prevented.

In the first exemplary embodiment, the second flow duct 2 through which the encapsulation film materials 14 flow and the third flow duct 3 through which the encapsulated liquid crystals 30 flow are illustrated to be placed on the same straight line, and the first flow duct 1 through which the liquid crystals 13 flow is illustrated to be orthogonal to the second flow duct 2 and the third flow duct 3 in the liquid crystal droplet generator 4. However, the first to third flow ducts 1, 2, and 3 may be disposed in various positions in order to optimize the size and manufacturing conditions of the encapsulated liquid crystals 30.

Hereinafter, an apparatus for manufacturing encapsulated liquid crystals according to a second exemplary embodiment is described in detail with reference to FIG. 5.

Figure 5:
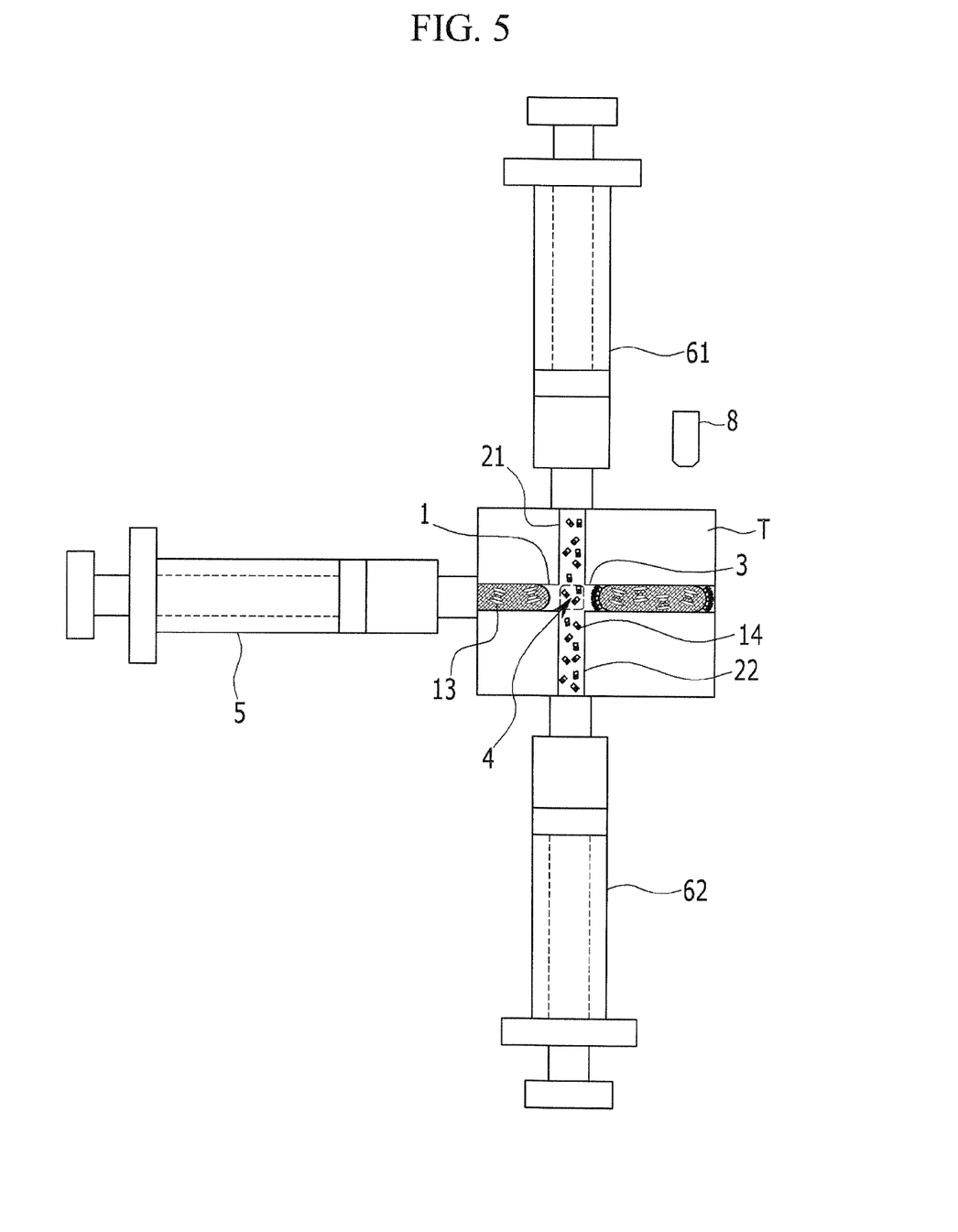
FIG. 5 is a schematic diagram showing an apparatus for manufacturing encapsulated liquid crystals according to a second exemplary embodiment.

FIG. 5 is a schematic diagram showing the apparatus for manufacturing encapsulated liquid crystals according to the second exemplary embodiment.

The second exemplary embodiment is substantially equivalent to the first exemplary embodiment of FIGS. 1 and 2 except only the locations where a first flow duct to a third flow duct are disposed, and a description of overlapping portions is omitted for simplicity.

As shown in FIG. 5, the apparatus for manufacturing encapsulated liquid crystals according to the second exemplary embodiment includes a first flow duct 1 configured to have liquid crystals 13 flow therethrough, a second flow duct 2 configured to have encapsulation film materials 14 flow therethrough, and a third flow duct 3 configured to have an inflow portion connected to the outflow portion of the first flow duct 1 and the outflow portion of the second flow duct 2. The first flow duct 1 and the third flow duct 3 are placed on the same straight line. The second flow duct 2 includes a second upper flow duct 21 and a second lower flow duct 22 which are met at a liquid crystal droplet generator 4. The second upper flow duct 21 and the second lower flow duct 22 are orthogonal to the first flow duct 1 and the third flow duct 3 at the liquid crystal droplet generator 4.

A first injector 5 for injecting the liquid crystals 13 into the first flow duct 1 is connected to the inflow portion of the first flow duct 1. A second upper injector 61 for injecting the encapsulation film materials 14 into the second upper flow duct 21 is connected to the inflow portion of the second upper flow duct 21. A second lower injector 62 for injecting the encapsulation film materials 14 into the second lower flow duct 22 may be connected to the inflow portion of the second lower flow duct 22.

The liquid crystals 13 flowing through the first flow duct 1 are mixed with the encapsulation film materials 14, flowing through the second upper flow duct 21 and the second lower flow duct 22, in the liquid crystal droplet generator 4. At this time, the liquid crystals 13 are separated from each other in a droplet form by means of the flow pressure of the encapsulation film materials 14 flowing from the upper and lower sides to the liquid crystal droplet generator 4. Next, the encapsulation film materials 14 surround the liquid crystals 13 of a droplet form by means of a self-assembly effect, thereby forming liquid crystal droplets 10. A curing machine 8 radiates ultraviolet (UV) to the liquid crystal droplets 10, thus curing the encapsulation film materials 14 of the liquid crystal droplets 10 into encapsulation films 15. Accordingly, the liquid crystal droplets 10 are made into the encapsulated liquid crystals 30. The encapsulated liquid crystals 30 flow along the third flow duct 3.

Alternatively, after the liquid crystal droplets 10 in which the encapsulation film materials 14 surround the liquid crystals 13 of a droplet form are drained from the third flow duct 3, the curing machine 8 may radiate ultraviolet (UV) to the liquid crystal droplets 10, thereby making the liquid crystal droplets 10 into the encapsulated liquid crystals 30.

A plurality of the encapsulated liquid crystals of a uniform size can be fabricated by repeating the above manufacturing process.

A liquid crystal display (LCD) including the encapsulated liquid crystals fabricated using the apparatus and method for manufacturing encapsulated liquid crystals according to the first and second exemplary embodiments is described in detail below with reference to FIG. 6.

Figure 6:
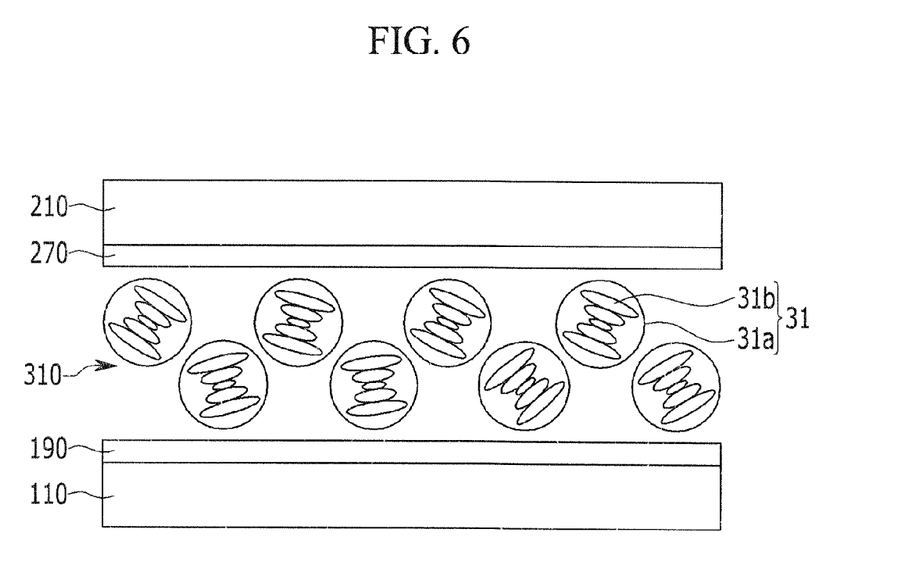
FIG. 6 is a cross-sectional view of a liquid crystal display (LCD) according to a first exemplary embodiment.

FIG. 6 is a cross-sectional view of a liquid crystal display (LCD) according to a first exemplary embodiment.

As shown in FIG. 6, the liquid crystal display (LCD) according to the first exemplary embodiment includes a first substrate 110 and a second substrate 210 configured to face each other and a cholesteric liquid crystal layer 310 disposed between the two substrates 110 and 210. A first electrode 190 may be formed on the first substrate 110 and a second electrode 270 may be formed on the second substrate 210, so that an electric field can be formed between the first electrode 190 and the second electrode 270. Spacers may be disposed between the first substrate 110 and the second substrate 210 in order to control the thickness of the cholesteric liquid crystal layer 310.

The first substrate 110 and the second substrate 210 may be formed of insulation substrates, such as transparent glass or plastic.

A plurality of cholesteric encapsulation liquid crystals 31 having a uniform size is dispersed in the cholesteric liquid crystal layer 310. Each of the cholesteric encapsulation liquid crystals 31 includes cholesteric liquid crystals 31b placed within each of cholesteric encapsulation films 31a. The cholesteric liquid crystal 31b may have a helical pitch which reflects a visible ray having a wavelength of 380 nm to 770 nm. The cholesteric encapsulation film 31a may have a thickness of 1 nm to 10 μm. If the thickness of the cholesteric encapsulation film 31a is too small, the cholesteric encapsulation liquid crystals 31 are likely to be broken. If the thickness of the cholesteric encapsulation film 31a is too great, elastic force of the cholesteric encapsulation liquid crystals 31 is deteriorated and thus a screen distortion phenomenon may occur when external pressure is generated. The thickness of the cholesteric encapsulation film 31a may vary according to the physical properties of a material of the cholesteric encapsulation film 31a.

The size of the plurality of cholesteric encapsulation liquid crystals 31 may range from 10 nm to 100 μm. The cholesteric encapsulation liquid crystals 31 are uniform and each may have a diameter within a deviation of ±6.5%.

The cholesteric liquid crystal layer 310 has two stable states of a planar state and a focal conic state and can maintain the two stable states although external voltage is not supplied. In the planar state, the cholesteric liquid crystals 31b have a helical structure and reflect light of a specific wavelength along the helical pitch. In the focal conic state, the cholesteric liquid crystals 31b have their helical axes arranged in a horizontal direction to the first electrode 190 and the second electrode 270 and transmit light.

Since the cholesteric liquid crystal layer 310 including the cholesteric encapsulation liquid crystals 31 is formed as described above, a color shift according to the viewing angle can be minimized and a screen distortion phenomenon, occurring when a liquid crystal display (LCD) is bent or when pressure is applied to the surface of a liquid crystal display (LCD), can be minimized. Accordingly, the bistability of the cholesteric liquid crystal layer 310 can be maintained.

Furthermore, since the cholesteric liquid crystal layer 310 including the cholesteric encapsulation liquid crystals 31 of a uniform size is formed, a screen distortion phenomenon resulting from external pressure can be prevented. Accordingly, a liquid crystal display (LCD) having a constant electro-optical characteristic and an excellent optical characteristic can be fabricated.

The first electrode 190 and the second electrode 270 are illustrated to be formed in order to apply a vertical electric field. However, both the first electrode 190 and the second electrode 270 may be formed over the first substrate 110 in order to apply a horizontal electric field, or three or more electrodes may be formed in order to apply both the vertical electric field and the horizontal electric field.

Furthermore, red reflection cholesteric liquid crystals, green reflection cholesteric liquid crystals, and blue reflection cholesteric liquid crystals for reflecting a red light, a green light, and a blue light, respectively, may be formed of the cholesteric encapsulation liquid crystals 31 having a uniform size. In this case, color can be implemented while a screen distortion phenomenon resulting from external pressure is prevented.

Meanwhile, the cholesteric encapsulation liquid crystals 31 of the cholesteric liquid crystal layer 310 may be left-handedness or right-handedness. However, the cholesteric liquid crystal layer 310 in which left-handed cholesteric encapsulation liquid crystals and right-handed cholesteric encapsulation liquid crystals 312 are mixed is possible.

Hereinafter, a liquid crystal display (LCD) according to a second exemplary embodiment is described with reference to FIG. 7.

Figure 7:
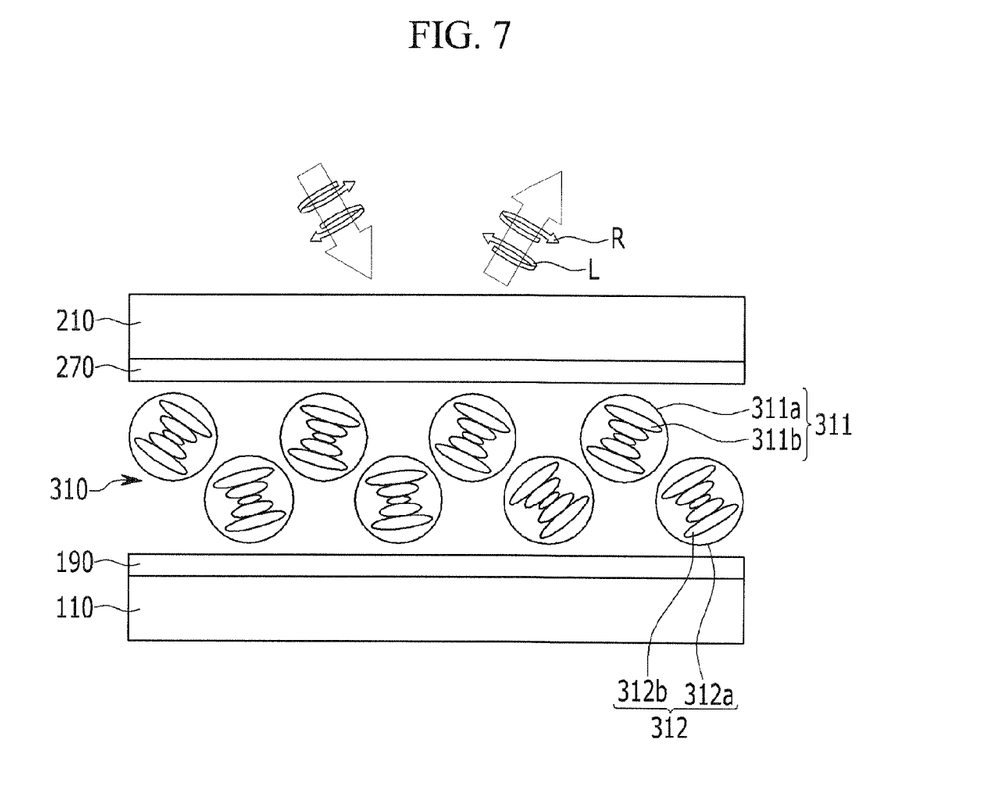
FIG. 7 is a cross-sectional view of a liquid crystal display (LCD) according to a second exemplary embodiment.

FIG. 7 is a cross-sectional view of the liquid crystal display (LCD) according to the second exemplary embodiment.

The second exemplary embodiment is substantially equivalent to the first exemplary embodiment of FIG. 6 except that the cholesteric liquid crystal layer 310 includes both left-handed cholesteric encapsulation liquid crystals and right-handed cholesteric encapsulation liquid crystals, and a description of overlapping portions is omitted for simplicity.

As shown in FIG. 7, a plurality of left-handed cholesteric encapsulation liquid crystals 311 and a plurality of right-handed cholesteric encapsulation liquid crystals 312 of a uniform size are dispersed in a cholesteric liquid crystal layer 310. The left-handed cholesteric encapsulation liquid crystals 311 and the right-handed cholesteric encapsulation liquid crystals 312 have a uniform size and each may have a diameter within a deviation of ±6.5%. Accordingly, a liquid crystal display (LCD) having a constant electro-optical characteristic and an excellent optical characteristic can be fabricated because a screen distortion phenomenon resulting from external pressure can be prevented.

The left-handed cholesteric encapsulation liquid crystals 311 include left-handed cholesteric liquid crystals 311b within each of left-handed cholesteric encapsulation films 311a. Each of the right-handed cholesteric encapsulation liquid crystals 312 includes right-handed cholesteric liquid crystals 312b within each of right-handed cholesteric encapsulation film 312a. The left-handed cholesteric liquid crystals 311b reflect a left-handed circular polarized light L, and the right-handed cholesteric liquid crystals 312b reflects a right-handed circular polarized light R.

In the liquid crystal display (LCD) of the first exemplary embodiment, only one of the left-handed cholesteric encapsulation liquid crystals 311 and the right-handed cholesteric encapsulation liquid crystals 312 are included in the cholesteric liquid crystal layer 310. Accordingly, the reflectivity of the cholesteric liquid crystal layer 310 may not exceed a maximum of 50%. In the liquid crystal display (LCD) according to the second exemplary embodiment, however, the left-handed cholesteric encapsulation liquid crystals 311 and the right-handed cholesteric encapsulation liquid crystals 312 are mixed in the cholesteric liquid crystal layer 310 and thus the reflectivity of the cholesteric liquid crystal layer 310 may be maximized.

Meanwhile, in the second exemplary embodiment, the left-handed cholesteric encapsulation liquid crystals 311 and the right-handed cholesteric encapsulation liquid crystals 312 are randomly mixed to form the cholesteric liquid crystal layer 310. However, the left-handed cholesteric encapsulation liquid crystals 311 and the right-handed cholesteric encapsulation liquid crystals 312 may instead have a layered structure.

Hereinafter, a liquid crystal display (LCD) according to a third exemplary embodiment is described in detail with reference to FIG. 8.

Figure 8:
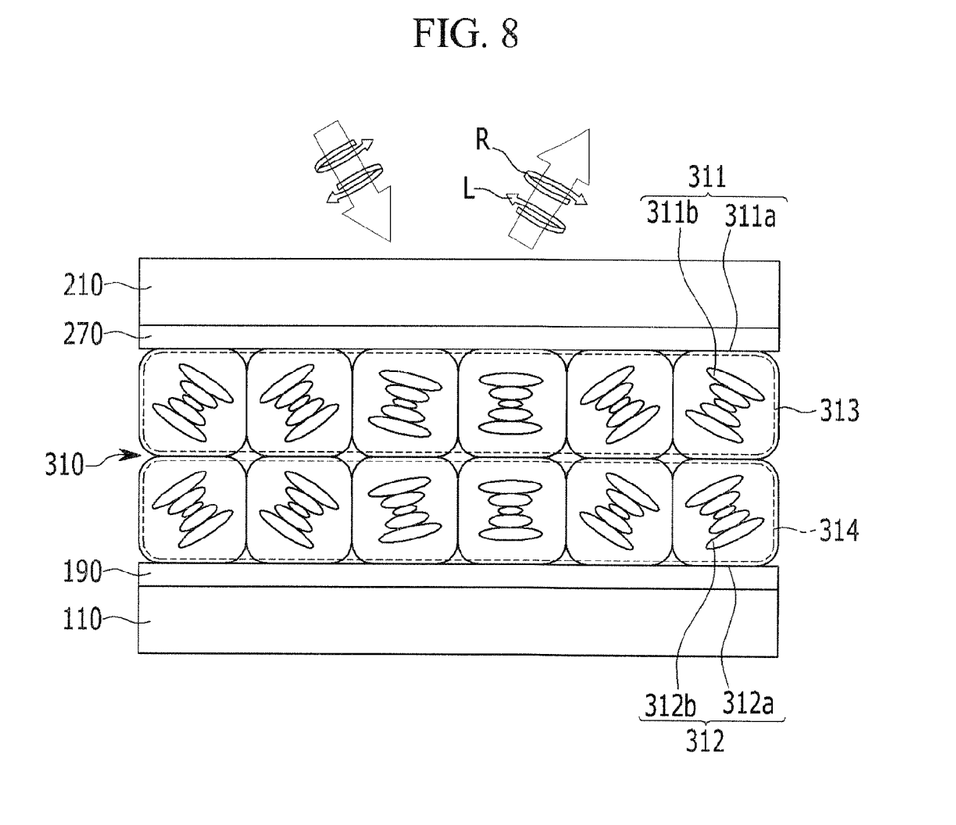
FIG. 8 is a cross-sectional view of a liquid crystal display (LCD) according to a third exemplary embodiment.

FIG. 8 is a cross-sectional view of the liquid crystal display (LCD) according to the third exemplary embodiment.

The third exemplary embodiment is substantially equivalent to the second exemplary embodiment of FIG. 7 except that the left-handed cholesteric encapsulation liquid crystals 311 and the right-handed cholesteric encapsulation liquid crystals 312 of a cholesteric liquid crystal layer 310 have a layered structure, and a description of overlapping portions is omitted for simplicity.

As shown in FIG. 8, the cholesteric liquid crystal layer 310 includes a left-handed cholesteric liquid crystal encapsulation layer 313 and a right-handed cholestric liquid crystal encapsulation layer 314 formed on the left-handed cholestric liquid crystal encapsulation layer 313.

The left-handed cholesteric liquid crystal encapsulation layer 313 includes a plurality of left-handed cholesteric encapsulation liquid crystals 311 having a uniform size. The right-handed cholesteric liquid crystal encapsulation layer 314 includes a plurality of right-handed cholesteric encapsulation liquid crystals 312 having a uniform size. The left-handed cholesteric encapsulation liquid crystals 311 and the right-handed cholesteric encapsulation liquid crystals 312 have a uniform size and each may have a diameter within a deviation of ±6.5%. Accordingly, since a screen distortion phenomenon resulting from external pressure can be prevented, a liquid crystal display (LCD) having a constant electro-optical characteristic and an excellent optical characteristic can be fabricated.

Furthermore, since the cholesteric liquid crystal layer 310 is formed of the left-handed cholesteric liquid crystal encapsulation layer 313 for reflecting a left-handed circular polarized light L and the right-handed cholesteric liquid crystal encapsulation layer 314 for reflecting a right-handed circular polarized light R, both the left-handed circular polarized light L and the right-handed circular polarized light R can be reflected. Accordingly, the reflectivity of the cholesteric liquid crystal layer 310 may be maximized.

Meanwhile, the liquid crystal display (LCD) of the first exemplary embodiment is illustrated to include the cholesteric liquid crystal layer 310 including the cholesteric encapsulation liquid crystals, but may include a nematic liquid crystal layer including nematic encapsulation liquid crystals.

Hereinafter, a liquid crystal display (LCD) according to a fourth exemplary embodiment is described in detail with reference to FIG. 9.

Figure 9:
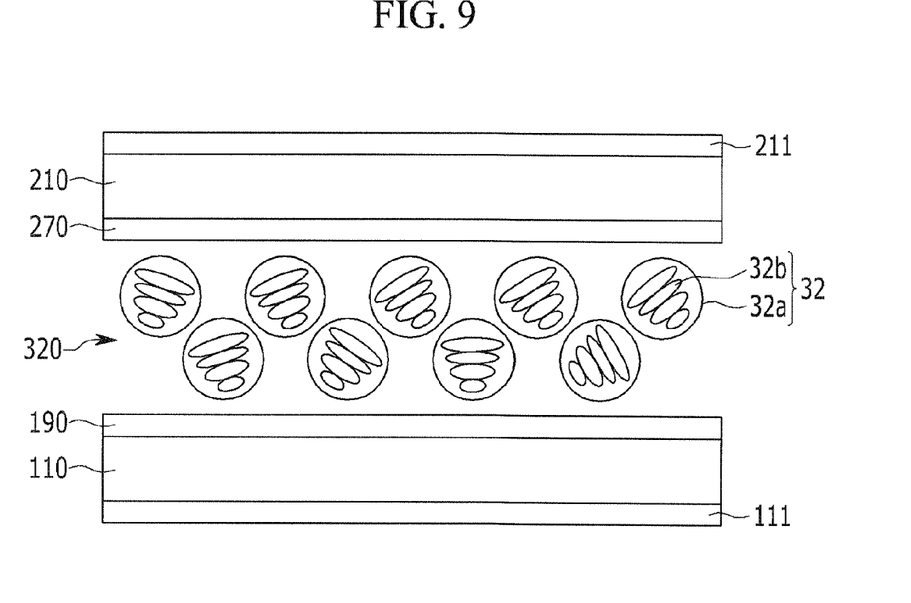
FIG. 9 is a cross-sectional view of a liquid crystal display (LCD) according to a fourth exemplary embodiment.

FIG. 9 is a cross-sectional view of the liquid crystal display (LCD) according to the fourth exemplary embodiment.

The fourth exemplary embodiment is substantially equivalent to the first exemplary embodiment of FIG. 6 except that a nematic liquid crystal layer is formed, and a description of overlapping portions is omitted for simplicity.

As shown in FIG. 9, the liquid crystal display (LCD) according to the fourth exemplary embodiment includes a first substrate 110 and a second substrate 210 configured to face each other and a nematic liquid crystal layer 320 disposed between the two substrates 110 and 210. A first electrode 190 may be formed on the first substrate 110, and a second electrode 270 may be formed on the second substrate 210. Thus, an electric field can be formed between the first electrode 190 and the second electrode 270. A first polarizing plate 111 and a second polarizing plate 211 are formed under the first substrate 110 and over the second substrate 210, respectively. The transmission axes of the first polarizing plate 111 and the second polarizing plate 211 may be vertical to each other or may have a specific angle. A phase delay film may be further formed in the first polarizing plate 111 and the second polarizing plate 211 in order to improve the viewing angle.

A plurality of nematic encapsulation liquid crystals 32 having a uniform size is dispersed in the nematic liquid crystal layer 320. The nematic encapsulation liquid crystals 32 include nematic liquid crystals 32b within each of nematic encapsulation films 32a. The size of the nematic encapsulation liquid crystals 32 may have a deviation of ±6.5% in diameter. Accordingly, a liquid crystal display (LCD) having a constant electro-optical characteristic and an excellent optical characteristic can be fabricated because a screen distortion phenomenon resulting from external pressure is prevented.

The nematic liquid crystals 32b may include twisted nematic (TN) liquid crystals, horizontally arranged nematic liquid crystals, axis-symmetrically arranged nematic liquid crystals, etc. and may be positive dielectric constant anisotropic liquid crystals or negative dielectric constant anisotropic liquid crystals. TN liquid crystals are shown in FIG. 9.

In the above, the first electrode 190 and the second electrode 270 are illustrated to be formed in order to supply a vertical electric field. However, both the first electrode 190 and the second electrode 270 may be formed over the first substrate in order to supply a horizontal electric field, or three or more electrodes may be formed in order to supply both the vertical electric field and the horizontal electric field.

Furthermore, an opening pattern for forming multiple domains may be formed in the first electrode or the second electrode in order to minimize a color shift according to the viewing angle.

Meanwhile, a rise of a driving voltage resulting from the encapsulation film can be minimized by adding nanoparticles to the nematic liquid crystal layer of the liquid crystal display (LCD) according to the fourth exemplary embodiment.

Hereinafter, a liquid crystal display (LCD) according to a fifth exemplary embodiment is described in detail with reference to FIG. 10.

Figure 10:
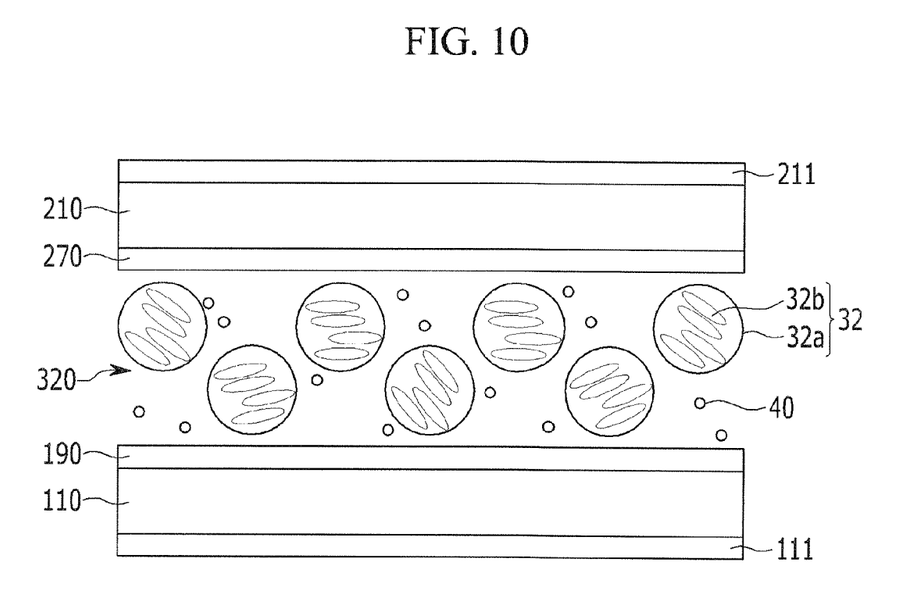
FIG. 10 is a cross-sectional view of a liquid crystal display (LCD) according to a fifth exemplary embodiment.

FIG. 10 is a cross-sectional view of the liquid crystal display (LCD) according to the fifth exemplary embodiment.

The fifth exemplary embodiment is substantially equivalent to the fourth exemplary embodiment of FIG. 9 except that nanoparticles are added to a nematic liquid crystal layer, and a description of overlapping portions is omitted for simplicity.

As shown in FIG. 9, the liquid crystal display (LCD) according to the fourth exemplary embodiment includes a first substrate 110 and a second substrate 210 configured to face each other and a nematic liquid crystal layer 320 disposed between the two substrates 110 and 210.

A plurality of nematic encapsulation liquid crystals 32 having a uniform size is dispersed in the nematic liquid crystal layer 320. A plurality of nanoparticles 40 is dispersed between the nematic encapsulation liquid crystals 32.

The diameter of each of the nanoparticles 40 may be 10 nm to 1 μm, and the nanoparticles 40 may be any one selected from among gold, silver, carbon nanotube, and ferroelectric materials.

The nematic encapsulation liquid crystals 32 include nematic liquid crystals 32b within each of encapsulation films 32a. Horizontally oriented nematic liquid crystals are shown in FIG. 10. The plurality of nematic encapsulation liquid crystals 32 has a uniform size and each may have a diameter within a deviation of ±6.5%. Accordingly, a liquid crystal display (LCD) having a constant electro-optical characteristic and an excellent optical characteristic can be fabricated because a screen distortion phenomenon resulting from external pressure is prevented.

Since the nanoparticles 40 are dispersed in the nematic liquid crystal layer 320, the dielectric constant of the nematic encapsulation film 32a can rise. An equation relating to the dielectric constant of a mixture of the nematic encapsulation film 32a and the nanoparticles 40 is written in Equation 1.

$$\in_m = \exp(B_1 \log \in_1 + B_2 \log \in_2) \quad \text{(Equation 1)}$$

wherein $\in_m$ is the dielectric constant of the mixture of the nematic encapsulation film 32a and the nanoparticles 40, $\in_1$ is the dielectric constant of the encapsulation film 32a, $\in_2$ is the dielectric constant of the nanoparticles 40, $B_1$ is the volume of the nematic encapsulation film 32a, and $B_2$ is the volume of the nanoparticles 40.

As shown in Equation 1, since the nanoparticles 40 having a specific volume and a specific dielectric constant are added to the nematic liquid crystal layer 320, the dielectric constant $\in_m$ of the mixture of the nematic encapsulation film 32a and the nanoparticles 40 can be raised.

Accordingly, the nematic encapsulation films 32a may function to prevent the generation of a voltage drop and thus prevent a driving voltage from rising. Furthermore, in the liquid crystal display (LCD) according to the fifth exemplary embodiment, the nanoparticles 40 are illustrated to be dispersed in the nematic liquid crystal layer 320. However, the nanoparticles 40 may instead be dispersed in the cholesteric liquid crystal layer 310 of the previous embodiments.

Meanwhile, in the liquid crystal display (LCD) according to the fifth exemplary embodiment, the nematic encapsulation liquid crystals 32 and the nanoparticles 40 are illustrated to be separated from each other and dispersed in the nematic liquid crystal layer 320. However, in the case where the plurality of nematic encapsulation liquid crystals 32 are formed of a single layer, the nanoparticles 40 may come in contact with the nematic liquid crystal layer 320.

Hereinafter, a liquid crystal display (LCD) according to a sixth exemplary embodiment is described in detail with reference to FIG. 11.

Figure 11:
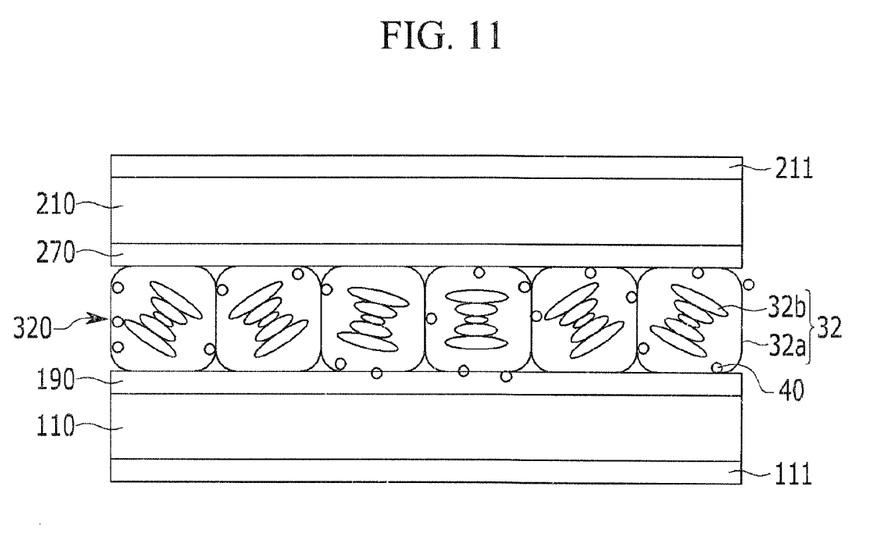
FIG. 11 is a cross-sectional view of a liquid crystal display (LCD) according to a sixth exemplary embodiment.

FIG. 11 is a cross-sectional view of the liquid crystal display (LCD) according to the sixth exemplary embodiment.

The sixth exemplary embodiment is substantially equivalent to the fifth exemplary embodiment of FIG. 10 except that the plurality of nematic encapsulation liquid crystals is formed of a single layer and the nanoparticles 40 come in contact with the nematic liquid crystal layer, and a description of overlapping portions is omitted for simplicity.

As shown in FIG. 11, the liquid crystal display (LCD) according to the sixth exemplary embodiment may include a first substrate 110 and a second substrate 210 configured to face each other and a nematic liquid crystal layer 320 disposed between the two substrates 110 and 210.

A plurality of nematic encapsulation liquid crystals 32 having a uniform size comes in contact with each other in the nematic liquid crystal layer 320. A plurality of nanoparticles 40 adhere between the nematic encapsulation liquid crystals 32.

The nematic encapsulation liquid crystals 32 include nematic liquid crystals 32b within each of nematic encapsulation films 32a. TN liquid crystals are shown in FIG. 11. The plurality of nematic encapsulation liquid crystals 32 has a uniform size and each may have a diameter within a deviation of ±6.5%. Accordingly, a liquid crystal display (LCD) having a constant electro-optical characteristic and an excellent optical characteristic can be fabricated because a screen distortion phenomenon resulting from external pressure is prevented.

Furthermore, since the nanoparticles 40 having a specific volume and a specific dielectric constant are added to the nematic liquid crystal layer 320, the dielectric constant $\in_m$ of the mixture of the nematic encapsulation film 32a and the nanoparticles 40 can be raised. Accordingly, the nematic encapsulation films 32a may function to prevent the generation of a voltage drop and thus prevent a driving voltage from rising.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display device, comprising:
   a first substrate;
   a first electrode formed on the first substrate;
   a second substrate configured to face the first substrate;
   a second electrode formed on the second substrate; and
   a liquid crystal layer formed between the first electrode and the second electrode and configured to include a plurality of encapsulated liquid crystals, including liquid crystals and encapsulation films each surrounding the liquid crystals,
   wherein a diameter of each of the plurality of encapsulated liquid crystals has a deviation of ±6.5% from an average diameter of the plurality of encapsulated liquid crystals, and wherein the encapsulation films are comprised of a different material than the liquid crystals,
   the liquid crystals are inserted into a first flow duct using a first injector;
   encapsulation film materials are injected into a second flow duct using a second injector;
   liquid crystal droplets being produced upon the liquid crystals and the encapsulation film materials being mixed at a liquid crystal droplet generator where an outflow portion of the first flow duct, an outflow portion of the second flow duct, and an inflow portion of a third flow duct are met; and
   the encapsulated liquid crystals each surrounded by cured encapsulation film materials that surround the liquid crystals of each of the liquid crystal droplets.

2. The liquid crystal display device of claim 1, wherein the encapsulated liquid crystals comprise cholesteric liquid crystals and encapsulation films each surrounding the cholesteric liquid crystals.

3. The liquid crystal display device of claim 2, wherein the liquid crystal layer includes only one of left-handed cholesteric encapsulated liquid crystals and right-handed cholesteric encapsulated liquid crystals.

4. The liquid crystal display device of claim 3, wherein the encapsulation film is comprised of a material selected from a group consisting of a silica-based or fluorine-based UV-curable surface active agent, different kinds of curable surface active agents, deionized gelatine, polyvinyl alcohol, and latex.

5. The liquid crystal display device of claim 2, wherein the cholesteric encapsulation film has a thickness of 1 nm to 10 microns, and a diameter of the cholesteric encapsulated liquid crystals may range from 10 nm to 100 microns.

6. The liquid crystal display device of claim 1, wherein the encapsulated liquid crystals comprise:

left-handed cholesteric encapsulated liquid crystals, including left-handed cholesteric liquid crystals and left-handed cholesteric encapsulation films each surrounding the left-handed cholesteric liquid crystals; and right-handed cholesteric encapsulated liquid crystals, including right-handed cholesteric liquid crystals and right-handed cholesteric encapsulation films each surrounding the right-handed cholesteric liquid crystals.

7. The liquid crystal display device of claim 6, wherein the left-handed cholesteric encapsulated liquid crystals form a left-handed cholestric liquid crystal encapsulation layer, and the right-handed cholesteric encapsulated liquid crystals form a right-handed cholestric liquid crystal encapsulation layer.

8. The liquid crystal display device of claim 6, wherein the liquid crystal layer is composed of a single layer that includes dispersions of both the left-handed cholesteric encapsulated liquid crystals and the right-handed cholesteric encapsulated liquid crystals.

9. The liquid crystal display device of claim 1, wherein the encapsulated liquid crystals comprise nematic encapsulated liquid crystals, including nematic liquid crystals and nematic encapsulation films each surrounding the nematic liquid crystals.

10. The liquid crystal display device of claim 1, wherein the encapsulated liquid crystals are evenly dispersed.

11. The liquid crystal display device of claim 1, wherein the encapsulated liquid crystals form at least one layer.

12. The liquid crystal display device of claim 1, further comprises nanoparticles dispersed between the encapsulated liquid crystals, each of the nanoparticles having a diameter in the range of 10 nm to 1 micron, the nanoparticles being comprised of a material selected from a group consisting of gold, silver, carbon nanotube and ferroelectric materials.

13. The liquid crystal display device of claim 1, wherein the encapsulation film has a thickness of 1 nm to 10 μm.

14. The liquid crystal display device of claim 1, wherein the liquid crystals are arranged as a single layer, the liquid crystal layer further comprising a plurality of nanoparticles being in contact with the liquid crystal layer and being adhered between the encapsulated liquid crystals.

15. The liquid crystal display device of claim 14, wherein each of the nanoparticles has a diameter in the range of 10 nm to 1 micron, the nanoparticles being comprised of a material selected from a group consisting of gold, silver, carbon nanotube and ferroelectric materials.

16. A liquid crystal display device, comprising:
a first substrate;
a first electrode arranged on the first substrate;
a second substrate configured to face the first substrate;
a second electrode arranged on the second substrate; and
a liquid crystal layer arranged between the first electrode and the second electrode and configured to include a plurality of encapsulated liquid crystals, including a plurality of liquid crystals and encapsulation films each surrounding the liquid crystals, wherein:
the liquid crystals are inserted into a first flow duct using a first injector;
encapsulation film materials are injected into a second flow duct using a second injector;
liquid crystal droplets being produced upon the liquid crystals and the encapsulation film materials being mixed at a liquid crystal droplet generator where an outflow portion of the first flow duct, an outflow portion of the second flow duct, and an inflow portion of a third flow duct meet;
the liquid crystals of each droplet surrounded by the encapsulation film materials through a self-assembly effect; and
the encapsulated liquid crystals, each being surrounded by a cured encapsulation film that surrounds each of the liquid crystal droplets, wherein a diameter of each of the first, second and third flow ducts is in micrometer units, the encapsulation films are comprised of a different material than that of the liquid crystals.

17. The liquid crystal display device of claim 16, wherein a flow rate of the liquid crystals in the first flow duct is 37 μl/minute and the flow rate of the encapsulation film materials in the second flow duct is 5000 μl/min, the encapsulation film materials comprise a material selected from a group consisting of a silica-based or fluorine-based UV-curable surface active agent, different kinds of curable surface active agents, deionized gelatine, polyvinyl alcohol, and latex.

* * * * *